(No Model.)
W. B. MILLER.
DENTAL MATRIX.
No. 351,065. Patented Oct. 19, 1886.
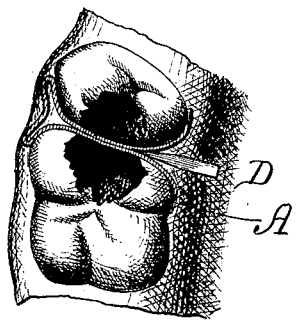
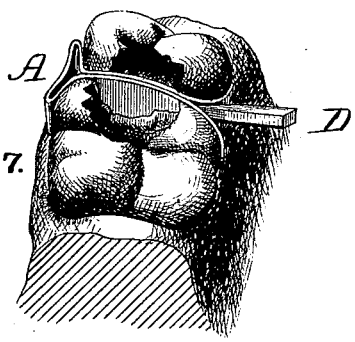
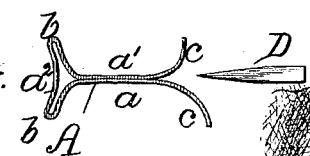
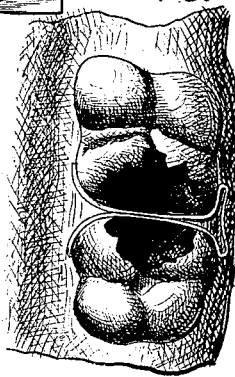
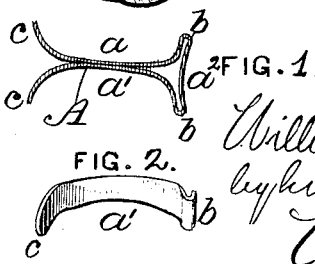
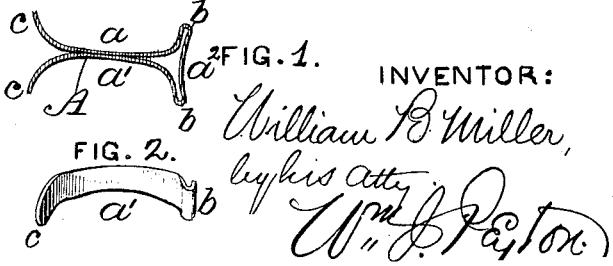
WITNESSES:
INVENTOR:
William B. Miller,
by his Atty

United States Patent Office.

WILLIAM B. MILLER, OF ALTOONA, ASSIGNOR TO THE S. S. WHITE DENTAL MANUFACTURING COMPANY, OF PHILADELPHIA, PENNSYLVANIA.

DENTAL MATRIX.

SPECIFICATION forming part of Letters Patent No. 351,065, dated October 19, 1886.

Application filed April 19, 1886. Serial No. 199,392. (No model.)

*To all whom it may concern:*

Be it known that I, WILLIAM B. MILLER, a citizen of the United States, residing at Altoona, in the county of Blair and State of Pennsylvania, have invented certain new and useful Improvements in Dental Matrices; and I do hereby declare the following to be a full, clear, and exact description of the invention, such as will enable others skilled in the art to which it appertains to make and use the same.

My invention relates to matrices for dental purposes.

The object of my invention is to facilitate the operation of filling large cavities in the approximal parts of the natural teeth while in the mouth.

Hitherto the dentist has on occasion placed a piece of thin sheet metal between two teeth, and by means of a wedge between the metal and one of the teeth has held the matrix against the tooth to be filled; but even if the abutting tooth were sound the two free ends of that matrix would by their leverage during the operation cause the annoying loosening of the wedge, and consequent disturbance of the matrix, while in the event of caries on both teeth such a matrix would be out of the question.

My invention consists, essentially, of a duplex matrix formed, preferably, from a single strip of thin sheet metal doubled upon itself, and so shaped, bent, curved, and recurved that the sides and edges of the two arms or members shall, when placed between two natural teeth, be so closely conformed to the approximal surfaces and cervical margins of such teeth that if one tooth or both teeth should be found carious it or they could be restored in contour by packing a filling material into the cavity or cavities and against one or both members of the duplex matrix.

My invention supplies a self-sustaining matrix altogether independent of the wedge, which may, however, be used as an auxiliary in case the thickness of the two members of the duplex matrix is not sufficient, and said matrix is also independent of the maintenance of one or both approximal parts of the teeth, because in their absence it will be held in position by the root portions of the teeth.

My improved duplex matrix may be made in various ways, the best of which at present known to me I have exhibited in the accompanying drawings and described or alluded to herein. The subject-matter claimed by me herein as of my first invention is particularly recited at the close of this specification.

In said drawings, Figure 1 is a plan view of one form of my duplex matrix, and Fig. 2 is a perspective view of one member thereof. Fig. 3 is a plan view of the matrix shown in Fig. 1 in position between two carious human molars. Fig. 4 is a plan view of a modified duplex matrix having members of unequal length, and Fig. 5 is a perspective of the longer member of the same. Fig. 6 is a plan view of the matrix shown in Fig. 4 in position between a molar and bicuspid, (upper right side,) with an auxiliary wedge in place; and Fig. 7 is a perspective thereof. Fig. 8 is a plan view of a modified matrix for the upper left side, the two members being of unequal length and widely separated; and Fig. 9 is a perspective of the longer member thereof. Fig. 10 is a plan, and Fig. 11 a perspective, of the matrix shown in Fig. 8 in position between a molar and bicuspid, (upper left side,) with the auxiliary wedge in place.

In Figs. 1, 2, and 3 is shown my preferred form of molar-matrix, which consists of a single strip of thin sheet metal bent to form the oppositely or reversely curved arms $a\ a'$ of the matrix A, which are maintained in suitable relations to each other and to the teeth when in use by the connecting bar or portion $a^2$. Said connecting bar or portion $a^2$ may, if desired, be made thicker or thinner than the members $a\ a'$; or it may consist of a rod or bar or connection riveted to the members $a\ a'$, or otherwise connected at the points $b\ b$, for example. The lateral curves of the members $a\ a'$ at their ends $b\ b\ c\ c$, as also their edge convexities and concavities, as shown in Fig. 2, may be varied to suit the kind of teeth and the cervical margins of the teeth, according to the circumstances of the case. The length as well as the width of said members $a\ a'$ will likewise be varied to conform them to the teeth to be operated upon, as is instanced in Figs. 4, 5, 6, and 7, where the member $a'$ is shorter than the member $a$, and is also differently curved to adapt it to the smaller and different tooth. The length of the coupling or connection $a^2$ is or may be also varied—as, for example, in Fig. 8—which permits the suitable separation of the members *a a'* for adaptation to the separated bicuspid and molar teeth shown in Figs. 10 and 11. In cases of this latter kind a matrix having members *a a'* of considerable rigidity would not need the auxiliary wedge D if a plastic material were to form the filling.

One of the great advantages of my improved matrix is, that on the completion of the filling, especially when the filling is a plastic one, the matrix may be removed without marring or disturbing the filling by simply pinching the free ends toward each other at the moment of removal.

I have deemed it unnecessary to allude to the details of preparing the cavity or the making and completion of the filling, because the dentist of ordinary skill will need no such instructions to enable him to use my invention.

The matrices may be made in pairs and of any suitable material, and may be polished to reflect light into the cavity or cavities. The width, thickness, curves, and length of the arms or members *a a'* and of the couplings or connections of said members may be varied to suit cases and circumstances without departing from the spirit of my invention of a duplex dental matrix for the purposes hereinbefore set forth.

I claim as my invention—

1. The dental matrix hereinbefore described, consisting of two arms or portions fitted for insertion between the tooth to be filled and the adjacent tooth, substantially as described.

2. A duplex dental matrix, the opposite arms or members of which are of reverse curvilinear configuration to adapt them to engage the adjacent teeth between which the matrix is fitted, substantially as described.

In testimony whereof I affix my signature in presence of two witnesses.

WILLIAM B. MILLER.

Witnesses:
A. H. S. WYMAN,
R. I. HUGHES.